United States Patent [19]

Vander Burgh

[11] 3,717,321
[45] Feb. 20, 1973

[54] HYDRAULICALLY ACTUATED SEAT ASSEMBLY

[75] Inventor: Lloyd A. Vander Burgh, Canton, Ill.

[73] Assignee: International Harvester Company, Chicago, Ill.

[22] Filed: Aug. 30, 1971

[21] Appl. No.: 175,893

[52] U.S. Cl. ............................................. 248/404
[51] Int. Cl. .............................................. B60n 1/02
[58] Field of Search......248/404, 419, 420, 424, 425, 248/429; 297/346, 349

[56] References Cited

UNITED STATES PATENTS

| | | | |
|---|---|---|---|
| 2,760,552 | 8/1956 | Kopitzki | 248/404 |
| 3,311,407 | 3/1967 | Aorie | 248/404 |
| 3,515,432 | 6/1970 | Sporman | 297/349 |
| 3,568,972 | 3/1971 | Sherman | 248/419 |
| 3,039,732 | 6/1962 | Kopitzki | 248/404 |

FOREIGN PATENTS OR APPLICATIONS

| | | | |
|---|---|---|---|
| 178,284 | 4/1954 | Austria | 297/346 |
| 596,063 | 12/1947 | Great Britain | 297/349 |

*Primary Examiner*—Marion Parsons, Jr.
*Attorney*—Floyd B. Harman

[57] ABSTRACT

A seat assembly having a bearing mounted support column containing a hydraulic cylinder and an extension, slidably attached to the top thereof, which supports a seat at a distance away from the column. A hydraulic piston is provided in the upper part of the support column which allows vertical lifting only of that part, the lower part comprising the hydraulic cylinder. A dogleg-shaped member is pivotally fixed at one of its ends to the lower part of the column, the other end being pivotally fixed to the extension. The elbow portion of the dogleg is positioned on the upper part of the support column such that when the column is hydraulically actuated the dogleg pivots thereby retracting or extending the extension and seat.

9 Claims, 4 Drawing Figures

PATENTED FEB 20 1973

INVENTOR
LLOYD A. VANDER BURGH

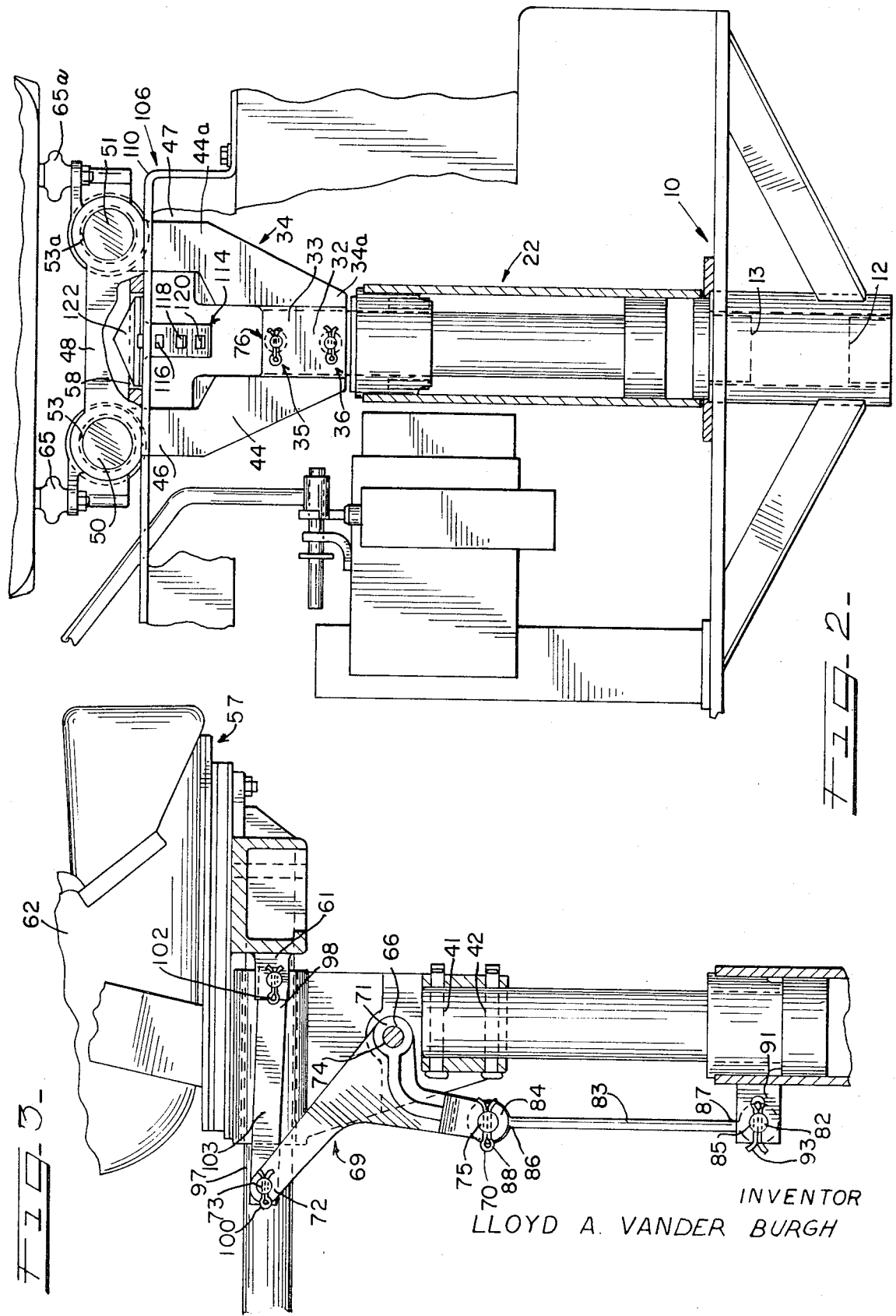

3,717,321

HYDRAULICALLY ACTUATED SEAT ASSEMBLY

BACKGROUND OF THE INVENTION

This invention relates generally to moveable seat assemblies and more particularly to an assembly which is actuated in two planes by a hydraulic force acting in only one plane.

Many vehicles are equipped with mechanisms which operate independently of each other, typical is a tractor loader which has been fitted with a backhoe. The operation of the different mechanisms involved in the backhoe loader tractor combination necessitate either several complete assemblies or one seat which is adaptable to several positions.

The problem of seat positioning is complicated by a general lack of space either to facilitate two separate seats or to allow for realignment of a single seat. The realigning of a single seat requires space not only in which to turn the seat, but also to provide safe clearance of the knees and legs of the operator. If two separate seats are provided, the operator must physically move himself from one seat to the other, which can be especially hazardous when bulky clothes are worn during cold weather or the surface of the equipment is covered with oil.

Previously, seats have been designed which could be rotated about a vertical axis, slid forward or backward, vertically adjusted, etc. These designs, however, often incorporated expensive and complicated mechanical mechanisms to accomplish the desired seat re-location. Further, it was necessary for the operator to manually move levers, raise pins, push plates, etc. to move the seat. This became particularly frustrating if the moving part had become rusted, bent, broken, etc. or if the weather was cold and the operator was wearing heavy gloves.

It is therefore an object of this invention to provide a hydraulically activated seat assembly which permits the seat to be elevated, centered and rotated free of any surrounding encumberances.

In accordance with this invention, a hydraulically movable seat assembly for a vehicle comprising a support column, means mounting the support column on the vehicle, said support comprising two parts, an upper vertically movable part having horizontally extending grooves and a lower rotatably movable part, a hydraulic system, means moving said upper support part vertically to said vehicle, a seat support means slidably received in said horizontally extending grooves; a seat mounted on said seat supporting means; and a slide activating means hingedly attached to said lower support part and said seat support means and pivotally mounted on said upper support part.

FIG. 2 is a sectional view taken generally along lines 2—2 of FIG. 1;

FIG. 3 is a side elevation similar to FIG. 1 showing the seat in a retracted elevated position to permit pivotal movement and displacement of the seat.

DESCRIPTION OF THE PREFERRED EMBODIMENT

Figures 1, 4:
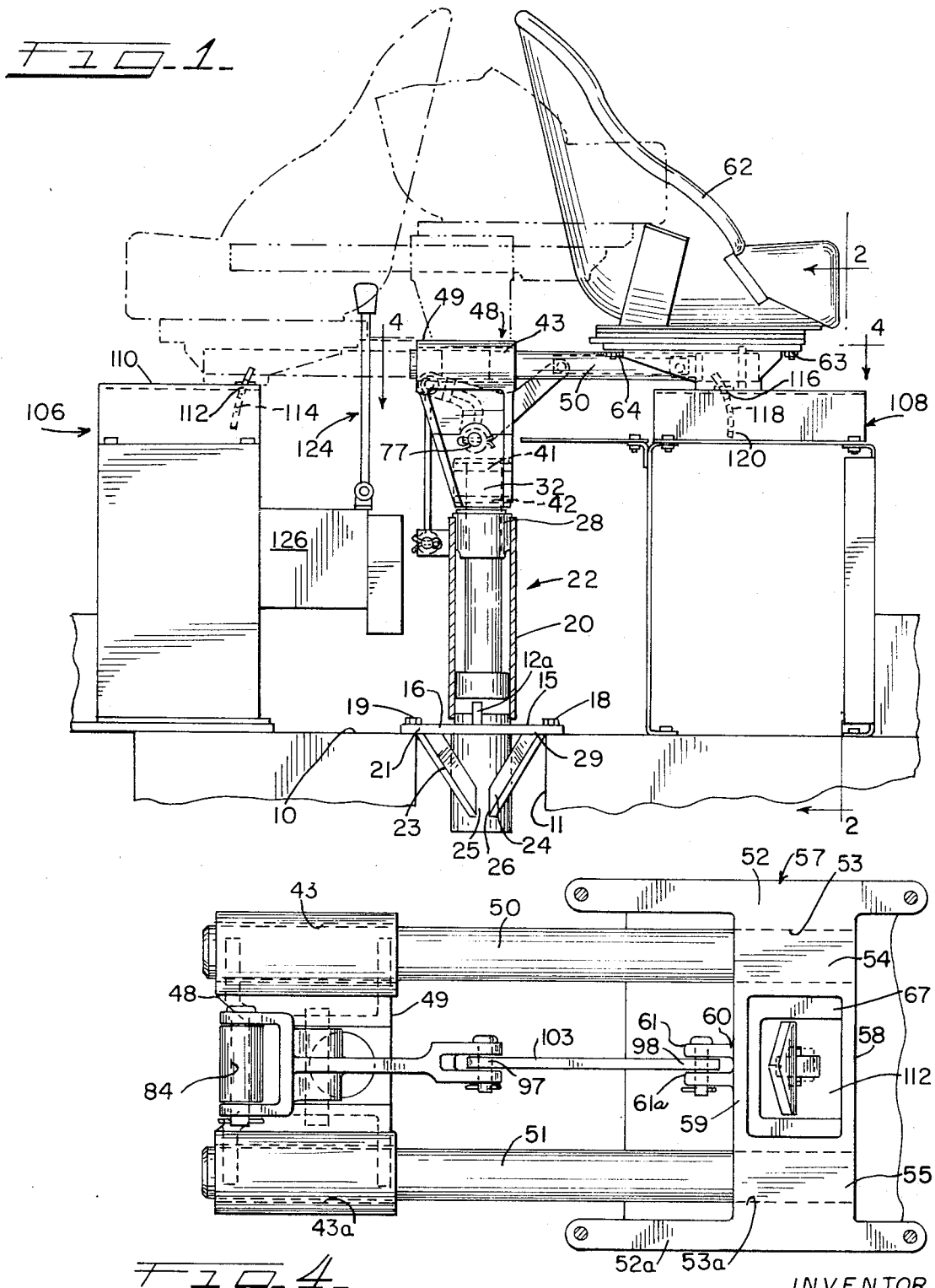
FIG. 1 is a side elevation of a movable seat assembly according to this invention, partially broken away to show the bellcrank and hydraulic mechanism and illustrating three positions of the seat assembly.
FIG. 4 is a sectional view taken generally along line 4—4 of FIG. 1.

Referring to FIG. 1 of the drawing, the vehicle (not shown) has a platform 10 which is apertured at 11. The base flange 15 is suitably secured to the platform 10 by means such as nut and bolt means represented at 18 and 19, said base flange further having an aperture corresponding to the aperture in platform 10. The double-acting hydraulic cylinder 22 has its tubular housing 20 extending through the apertures of the base flange 15 and the platform 10 a distance below the platform 10, said hydraulic cylinder being pivotally mounted on bearings 12 and 13. Rectangularly shaped struts 23 and 24 are welded to the tubular housing or mounting collar at 25 and 26 and to the platform 10 at 21 and 29. The hydraulic piston 32 is located above the top extreme 28 of the tubular housing 20 and is retractively extendable out therefrom. Adjacent the hydraulic cylinder or support column 22 and projecting up from the platform 10 is a tab or finger 12a. At a point on the opposite side of the support column 22 and at a height thereon is located a corresponding finger or tab so situated that when the column is turned through 180°, the two tabs abut and prevent further pivoting.

Secured over the top end 33 of the piston 32, as shown in FIG. 2, is a Y-shaped bifurcated casting 34. The casting has a cylindrical vertically extended journaled base 34a which is dimensioned to receive the top 33 of the piston 32. The casting is secured to the top 33 by a suitable means such as bolts and cotter pins represented at 35 and 36 which extend through two vertically spaced transversely disposed openings 41 and 42.

The Y-shaped casting has transversely disposed channels or tubular bores 43 and 43a located at the upper extremes 46 and 47 of the arms 44 and 44. casting. The elongated bores extend from the front 48 to the back 49 of the casting, and are adopted for slidably receiving spaced apart shafts 50 and 51.

As shown in FIG. 4, attached to the end extremes 54 and 55 of the shafts 50 and 51 is a seat supporting means or mounting plate 57. The mounting plate is an H-shaped casting, the legs 52 and 52a of the H having elongated tubular bores 53 and 53a adopted for slidably receiving the ends of the shafts 50 and 51. The portion 58 which joins the two legs 52 and 52a of the H has extending off the back portion 59 at 60 a finger set 61 which is provided with transversely disposed openings, further the portion 58 is apertured at 67. A seat 62 is positioned on the mounting plate 57 and a suitable securing means, such as cotter pin and bolt means represented at 63 and 64 may be utilized to fixedly mount the seat. Preferably the seat is secured to a sliding track system 65 and 65a, which, in turn, is secured to mounting plate 57. The sliding track system allows the operator to adjust the seat horizontally to the desired position.

As thus arranged the seat is supported in a cantilever fashion above and away from the hydraulic cylinder system which functions as the supporting column.

The Y-shaped casting has a transversely disposed opening 66 that extends through both arms 44 and 44a of the Y at a distance slightly above the divergence of the two arms. A bellcrank lever 69, having an input end 70, and elbow 71 and an output end 72, each being provided with transversely disposed openings 73, 74 and 75, is pivotally secured to the Y-casting such that the elbow of the bellcrank lever is adjacent to the clev 76 of the arms 44 and 44a of the Y. The bellcrank lever is fixed to the Y-shaped casting by a suitable securing means, such as a bolt and cotter pin means represented at 77 which employs transversely disposed opening 66.

A tension link 83, having transversely disposed openings 84 and 85 at ends 86 and 87, is pivotally secured to the input end 70 of the crank 69 by a suitable means, such as a bolt and cotter pin means 88. Located on the cylinder collar 20 is a set of tabs or fingers 91 having a transversely disposed opening 82. The end 87 of the tension crank 83 is pivotally secured to the tab set 91 by a suitable securing means, such as a bolt and cotter pin means 103.

A tension link 103 which has transversely disposed openings at ends 97 and 98, is pivotally secured to the output end 72 of the bellcrank by a suitable securing means, such as a bolt and cotter pin means 100, end 98 being secured to the seat mounting plate by pivotal attachment to finger set 61 by a suitable means, such as a bolt and cotter pin 102.

The identical box-like members 106 and 108 provides a convenient and highly satisfactory support upon which the seat may be secured, without any degree of permanence. The top 110 of the member 106 is apertured at 112. Positioned extendably through the aperture is a curved member 114, being provided with several transversely disposed openings 116, 118, 120. The top 122 of the curved member is wedge shaped to better mate with aperture 67 in the seat mounting plate 57. Thus, by securing the curved member with a suitable means such as a bolt and cotter pin through an appropriate transversely disposed opening to the wedge portion can be extended to mate with the seat mounting plate at a variety of heights, according to the operator's preference.

An identical arrangement exists with box member 108, when it is desired to position the seat thereover.

As heretofore described, it is readily apparent that the seat 62 through mounting plate 57 and shafts 50 and 51 is slidably retractable to Y-casting 34, when the Y-casting is vertically actuated by the hydraulic piston 42. The retracting force being provided by the bellcrank lever 69 which, since it is attached to the collar 20 through tension link 83, pivots on the clev 76 of the Y-casting drawing the mounting plate in through tension link 103.

To move the seat from solid line position to the reversed phantom line position, an operator, (not shown), grasps handle 124 and actuates the hydraulic mechanism 126. As the piston 32 elevates, the seat is being retracted toward the support column, thus not only reducing the strain on the support column, but reducing the radius required for pivoting the seat and operator. While in the elevated position, the operator physically pivots the seat to the desired reversed location and then reactivates the double acting cylinder which lowers the piston and re-extends the seat.

Thus, the movable seat assembly according to this invention as a result of an interdependent functional relationship, permits the seat to be simultaneously elevated and centered, then pivoted without the displacement of the operator. By the elevation and retraction of the seat the operator and seat are raised above crowded or encumbering mechanisms and further, the arc of rotation is substantially reduced. It will be appreciated, also that the seat assembly provides an arrangement which permits the operator to pivot his seat while remaining therein, by the simple activation of a hydraulic system.

Although only a preferred form of the invention has been illustrated, and that form described in detail, it will be apparent to those skilled in the art that various modifications may be made therein, without departing from the spirit of the invention or from the scope of the claims.

What is claimed is:

1. A vehicle seat assembly hydraulically actuated by the vehicle's hydraulic system comprising:
    a support column including a hydraulic cylinder, means mounting the support column on said vehicle, said support comprising two parts, an upper vertically movable part having horizontally extending grooves and a lower rotatably movable part, a seat support means slidably received in the said horizontally extending grooves, a seat mounted on said seat supporting means; and a slide actuating means, hingedly attached to said lower support part and said seat supporting means and pivotally mounted on said upper support part.

2. The seat assembly of claim 1 wherein: said hydraulic cylinder is a double action cylinder having a piston; and said upper vertically movable part being fixed to said piston.

3. The seat assembly of claim 1 wherein: said upper vertically movable part is a bifurcated member having arms.

4. The seat assembly of claim 1 wherein: said seat support means comprises;
    a generally H-shaped member having parallel horizontally extending bores and a centrally located aperture;
    a finger set extending off said H-shaped member; and
    a sliding track system having a seat secured thereon.

5. The vehicle seat assembly of claim 1 wherein: said slide actuation means is a bellcrank lever.

6. The vehicle seat assembly of claim 1 including: a seat locking means to interlock said seat with said vehicle.

7. A hydraulically movable seat assembly for a vehicle comprising: a support column, means mounting the support column on said vehicle, said support comprising two parts, an upper vertically movable part having horizontally extending grooves and a lower rotatably movable part, a hydraulic system, means moving said upper support part vertically to said vehicle, a seat support means slidably received in the said horizontally extending grooves, a seat mounted on said seat supporting means; and a bellcrank lever hingedly attached to said lower support part and said seat supporting means and pivotally mounted on said upper support part.

8. A vehicle seat assembly hydraulically actuated by the vehicle's hydraulic system comprising: a support column, means mounting said support column on said vehicle; said support column comprising a double action hydraulic cylinder having a piston extending out therefrom, a bifurcated member having arms rigidly affixed to said piston having elongated bores at the top extremes thereof for slidably accommodating elongated members, a pair of elongated members slidingly positioned in said bores and extending away from said support column, a seat means fixed to the ends of said elongated members, a bellcrank lever means having an input end, an elbow and an output end, said elbow being pivotally mounted between the arms of said bifurcated member, said input end being attached pivotally to said cylinder and said output end being attached to said seat, said crank means being arranged so as to pivot as the piston is raised relocating said seat; and a seat locking means to interlock said seat with said vehicle.

9. The vehicle seat assembly of claim 2 wherein said locking means comprises:
- an apertured supporting means secured to said vehicle;
- a shaft means positioned extendably in said supporting means aperture; and
- a shaft receiving aperture in said seat means.

* * * * *